United States Patent [19]

Taub et al.

[11] 4,029,746

[45] June 14, 1977

[54] MOVABLE PELLETIZING ROLLS

[75] Inventors: Steven I. Taub, Wilmington, Del.; Frederic J. Osterman, Ardmore, Pa.

[73] Assignee: IU Conversion Systems, Inc., Philadelphia, Pa.

[22] Filed: Nov. 17, 1975

[21] Appl. No.: 632,673

[52] U.S. Cl. ................................ 425/363; 425/453; 425/454

[51] Int. Cl.[2] .......................................... B29C 15/00

[58] Field of Search .......... 425/363, 365, 310, 311, 425/DIG. 230, 453, 454, 404, 445, 331

[56] References Cited

UNITED STATES PATENTS

| | | | |
|---|---|---|---|
| 3,419,649 | 12/1968 | Livingston et al. | 425/453 X |
| 3,561,050 | 2/1971 | Danforth | 425/79 X |
| 3,704,979 | 12/1972 | Thiessen | 425/454 X |

*Primary Examiner*—Robert L. Spicer, Jr.
*Attorney, Agent, or Firm*—Miller & Prestia

[57] ABSTRACT

Apparatus assembly including continuous particle forming means, such as pelletizer, mounted on mobile platform, adapted to deposit compression formed particles as they are formed substantially throughout a large curing area to permit at least partial hardening of the particles prior to further handling. Preferably, rail mounted longitudinal and transverse supports permit movement of the pellitizer both transversely and longitudinally through predetermined paths. Most preferably, pelletizer is also mounted with elevation means to permit raising and lowering and thereby to control the drop of freshly formed particles and to permit their disposition with minimum drop as inventory of formed particles accumulates.

11 Claims, 3 Drawing Figures

MOVABLE PELLETIZING ROLLS

Figure 1:
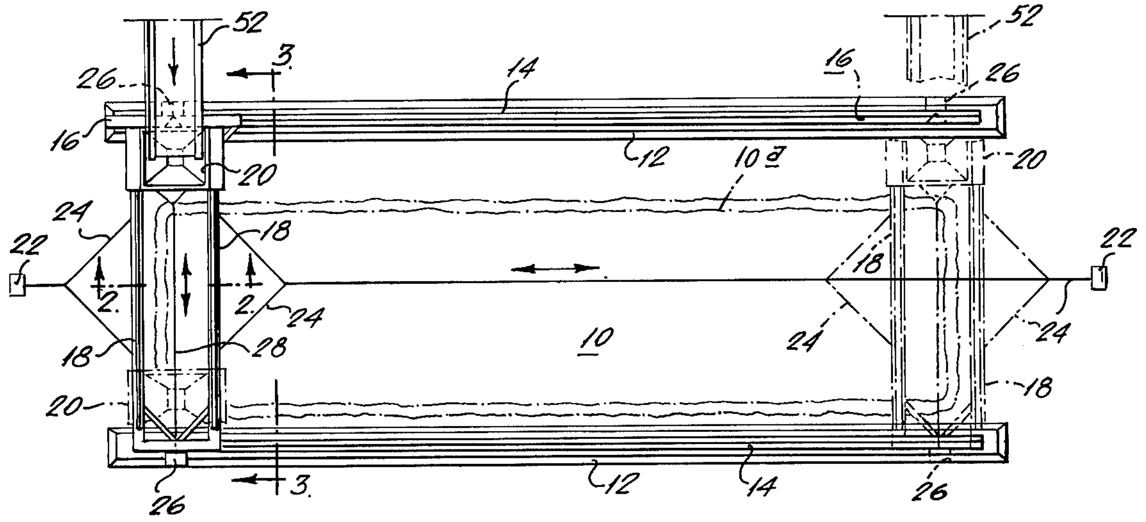

This invention pertains to an apparatus for forming and curing compression formed particles. More specifically, it pertains to an apparatus for forming synthetic aggregate from cementitiously hardenable materials and simultaneously depositing formed aggregate particles with no intermediate hardening to facilitate at least partial curing or hardening before further handling.

Various pelletizer and particle forming machines have been proposed and their applications have included the forming of cementitious material into synthetic aggregate particles. One preferred pelletizer for performing this function is an economical and effective manner is that described and claimed in U.S. Pat. No. 3,561,050 — Danforth, of common assignment herewith, the disclosure, illustrations, and claims of which are incorporated herein by reference.

In all pelletizers heretofore proposed, an inherent disadvantage has been the continuing necessity of removing an inventory of freshly formed particles to permit the continued operation of the machine. Many types of compression formed particles, including particularly cementitiously hardenable synthetic aggregate particles, have insufficient "green" strength, i.e., strength in the freshly formed stage, to resist breakage if they are dropped any substantial distance or handled in any conventional industrial type of handling apparatus. Thus, in the conventional operation of pelletizers for operation such as that described, a significant problem has been the particle size break-down and general deterioration of the freshly formed particles.

The general object of the present invention is to provide an apparatus for forming and at least partially curing compression formed particles in a manner to prevent their mechanical breakdown due to mishandling in a pre-cured condition.

This object and other which will be apparent in the course of the subsequent description of this invention, are met, briefly, by an apparatus for forming and curing compression formed particles comprising a continuous particle forming means, such as a pelletizer of the type disclosed in the above-referenced Danforth patent, mounted on a mobile platform including means for moving the mobile platform to cover an area sufficiently large to hold an inventory of freshly formed particles. Preferably, this invention comprises an intermeshing land and groove horizontally disposed pair of pelletizer rolls mounted on a platform with driving means for the rolls and hopper means for feeding material to the rolls, with the platform mounted on transverse beams, along which the platform can be moved, and the transverse beams being in turn mounted to permit longitudinal movement thereof along the length of a curing area. Preferably also the platform includes elevation means so that the roll pelletizer may be raised and lowered to control the drop distance of the freshly formed particles to the surface of the curing area or to the surface of an inventory of pre-cured or partially cured particles previously deposited over the curing area. Most preferably, this invention includes automatic means for moving said platform through a predetermined path substantially throughout the curing area.

Figure 2:
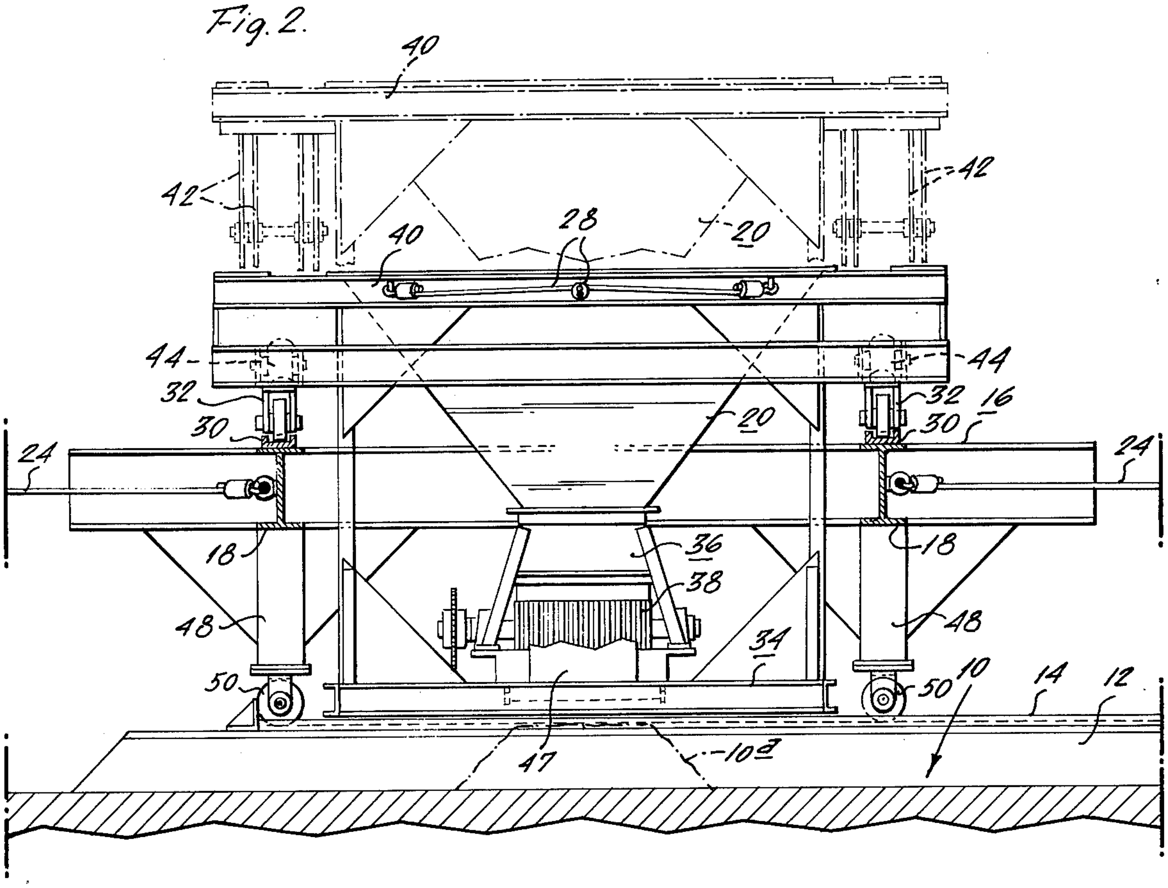
Figure 3:
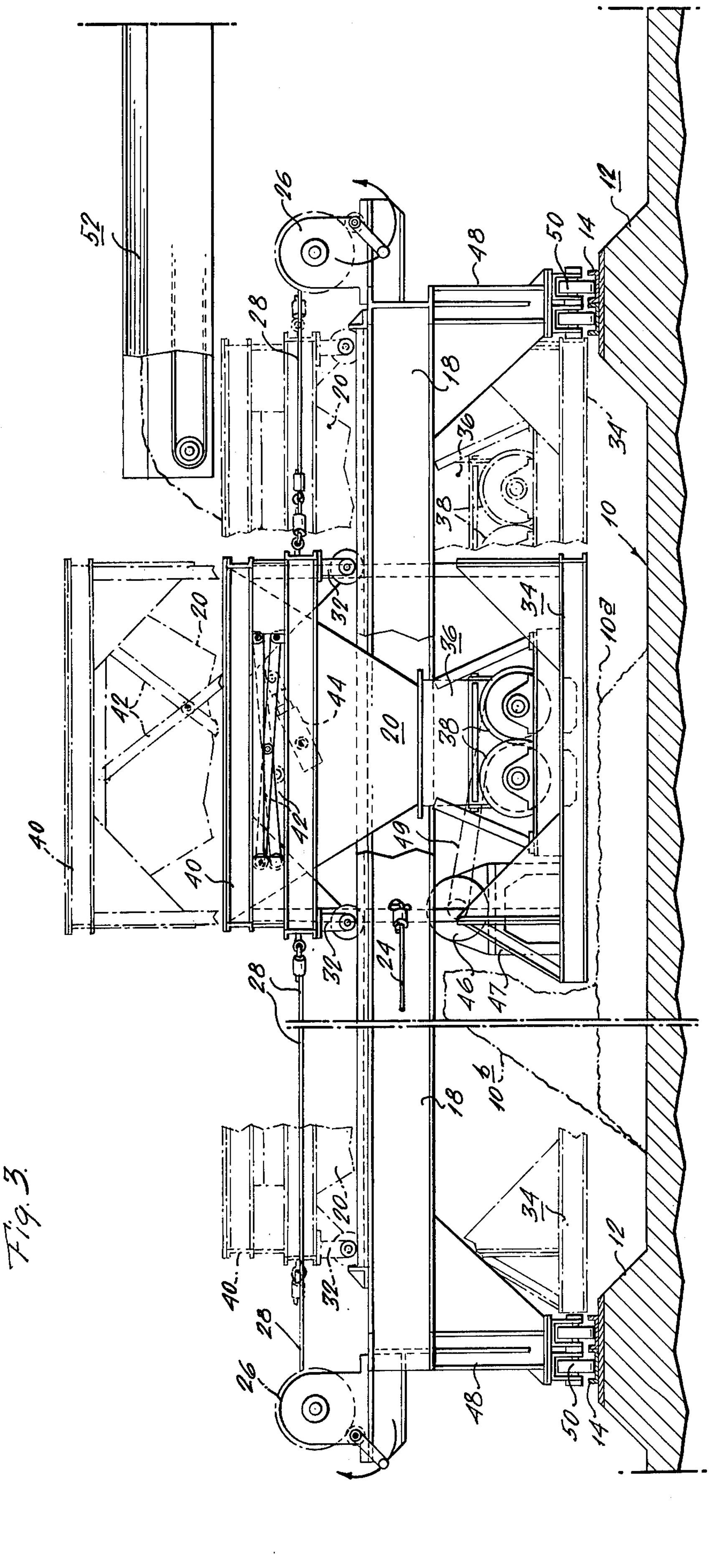

This invention may be better understood by reference to the following detailed description thereof and the appended claims, taken together with the figures, in which:

FIG. 1 is a plan view of the apparatus of this invention;

FIG. 2 is a sectional view, in plane 2—2 of FIG. 1, of the apparatus in this invention; and FIG. 3 is a side view, partially cut away to show certain details, of the apparatus shown in FIGS. 1 and 2, sectioned in the plane 3—3 of FIG. 1.

Referring more specifically to FIG. 1, there is shown a curing area 10, on the sides of which are disposed a pair of longitudinal supports 12 and tracks 14. Disposed to move along said tracks is a carriage assembly 16 including transverse beams 18 and on which is mounted, in a manner permitting transverse movement thereof, a platform in turn carrying a pelletizer including a hopper 20.

Winch means 22 with cables 24 are provided to move carriage assembly 16 along the length of curing area 10. Similarly, winch means 26 and cables 28 are provided to effect transverse movement of the pelletizer on carriage assembly 16.

Arrows in FIG. 1 depict the relative movement of carriage assembly 16 and pelletizer including hopper 20 mounted on carriage assembly 16. Other movement means may be provided to permit movement of pelletizer substantially throughout curing area 10 and thereby to permit direct deposition of freshly formed particles therefrom over curing area 10.

Hopper 20 is shown in phantom near the bottom of the left of FIG. 1 to show its permissible transverse movement and carriage assembly 16 with hopper 20 are shown (also in phanton) to right of FIG. 1 to show their permissible longitudinal movement.

Preferably, automaic means are provided to effect transverse and longitudinal movement of the pelletizer and assoicated hopper 20, as seen in the plan view of FIG. 1, to provide systematic coverage of freshly formed particles throughout curing area 10. In this manner, at least partial curing of freshly formed particles is permitted prior to transfer or handling of the particles either to further treatment or use. In one possible mode of operation, the apparatus for forming and curing particles shown in FIG. 1 may be operated such that one of the longitudinal halves of curing area 10 is covered by freshly formed particles in approximately the time necessary for sufficient pre-curing of the freshly formed particles to permit their subsequent handling without mechanical deterioration. Thus while freshly formed particles are being deposited in the other half of curing area 10, the particle material in the first half of curing area 10 may be removed. In a typical operation, the entire curing area may be covered in an 8-hour shift with material in each half of curing area 10 being removed every 4 hours. Alternatively, curing area 10 may be slowly covered throughout an 8-hour shift and the plant shut down for 16 hours. At the beginning of the subsequent day's operation, the particle material in the entire curing area 10, having cured for 16 to 24 hours, may then be removed for use or further curing.

With reference to the mechanical details of operation of the apparatus seen in FIG. 1, and referring more specifically to FIG. 2, there is shown longitudinal side support 12, track 14, transverse beams 18 including transverse tracks 30, in which ride wheel supports 32 carrying pelletizer platform 34, pelletizer 36 including pelletizer rolls 38 having spaced lands and grooves and hopper suspension beams 40. Scissor jack elements 42, operated by pistons 44 (and also shown in phantom in extended position in FIG. 2) are provided as an elevation means to permit raising and lowering of pelletizer 36 above the surface of curing area 10 or a raised level of inventory 10*a* of freshly formed particles.

Details of pelletizer 36 and pelletizer rolls 38 are not included herein. They are essentially similar to those shown in the above-referenced Danforth patent and include journal and driving means, not shown.

In the side view of FIG. 3, which is an enlarged view like FIG. 2 of the apparatus shown in plan in FIG. 1, drive means for pelletizer rolls 38 which includes prime mover 46, support frame 47 and chain drive 49 is seen. Chain drive 49 is similar to that shown in the above referenced Danforth patent. There is again shown transverse beams 18 together with vertical supports 48 on wheeled rollers 50 (also seen in FIG. 2), disposed on either end of transverse beams 18 and mounted for rolling movement over tracks 14 on longitudinal side supports 12. The elevational movement of hopper 40 by scissor jack elements 42 and piston 44 are also seen, in phanton, in FIG. 3. Further shown in phantom is the leftward and rightward movement of the horizontal transverse movement of the lowered hopper 40 and pellitizer rolls 38, respectively. Winch means 26 and cables 28 are also shown, together with the various elevations of the curing area ground level 10, one level of inventory of partially cured particle material 10*a* and a higher surface level of a larger inventory of particle material 10*b*. As will be apparent, elevation of hopper 40 and pelletizer 36, mounted on platform 34 facilitates deposition of freshly formed particles from pelletizer 36 onto the curing area surface itself or to the raised surface of previously deposited particle material, as seen in FIG. 3.

Loading of hopper 40 with material to be formed into particles by pelletizer 36 may be accomplished by any of numerous means. For example, a front end loader may deposit material into hopper 40 with hopper 40 at either of its extreme transverse positions. Alternatively, an extended conveyor may be associated with hopper 40 to continuously feed material thereto. Still further, a loading conveyor 52 may be mounted along one side of the particle forming and curing apparatus of this invention and disposed to feed material continuously to hopper 40 or to a separate raised hopper under which hopper 40 is passed periodically during the operation of the apparatus. One particularly preferred application of the present invention is that of making synthetic aggregate from cementitious materials formed from waste products, such as desulfurization scrubber sludges. In such cases, the apparatus described and illustrated herein, or modifications of this apparatus, may be disposed adjacent a waste treatment facility and adapted to receive cementitious material formed therein continuously.

The synthetic aggregate product which may be formed in accordance with the description of the operation of the apparatus described herein will be of relatively uniform particle size due to the spontaneous breakage of the strips of cementitious material formed in the pelletizer rolls in the preferred form of the present invention. To form graded aggregate, such particles, after curing, may be further crushed and graded.

As will be apparent to those skilled in the art, the present invention has been described only with respect to a specific embodiment for purposes of illustration. While this embodiment is preferred, various modifications may be made and various other forms of the present invention may be devised by those skilled in the art without departing from the true spirit and scope as taught herein. For example, the pelletizer mounting means may comprise a platform suspended between longitudinally movable side supports or alternatively may be mounted on static side supports with longitudinal movement associated with the side supports of the transverse beam assembly, as shown and described above. Similarly, while the preferred embodiment has been described to include winch and cable means for transverse and longitudinal movement of pelletizer 36 and pelletizer mounting platform 34, the actual movement and path of movement of pelletizer 34 may be automatically controlled to cover substantially the entire curing area 10 or it may be semi-automatically controlled in its transverse movement and periodically manually controlled to effect longitudinal movement of predetermined velocity. Various other modifications will occur to those skilled in the art. The appended claims are intended to be construed to cover all such alternative embodiments and variations of the present invention which may be made without departing from the true spirit and scope thereof.

We claim:

1. Apparatus for forming and curing compression formed particles comprising continuous particle forming means, said forming means mounted on a mobile mount adapted to move said forming means over a particle curing area with limited vertical clearance between the outlet of said forming means and the surface of said particle curing area, said mounted forming means being adapted to deposit particles formed in said forming means, with minimum drop and handling, substantially throughout said curing area.

2. Apparatus, as recited in claim 1, wherein said forming means comprises a pair of pelletizing rolls mounted for rotation about parallel axis, said rolls each including a peripheral resilient portion having a plurality of spaced continuous circumferential grooves in the outer face thereof defining circumferential lands therebetween, said rolls being juxtaposed with the lands of each roll intermeshing with the grooves of the opposed roll, and drive means for rotating said rolls, said resilient roll portions being adapted to permit material passing between said lands and said grooves during rotation of said rolls to effect a uniform compression of the material into elongated ribbons, the ribbons being discharged from said rolls by the elastic return of the deformed roll portions.

3. Apparatus, as recited in claim 2, wherein each of said lands includes a plurality of circumferentially spaced teeth projecting radially therefrom.

4. Apparatus, as recited in claim 1, wherein said mounting means comprises platform means suspended between longitudinally movable side supports on transverse beams, said platform means also being movable along said transverse beams.

5. Apparatus, as recited in claim 1, wherein said mounting means comprises static longitudinal side supports, transverse beams suspended therebetween, a forming means platform mounted on said transverse beams, means for moving said platform along said transverse beams and means for moving said transverse beams along the length of said longitudinal side supports.

6. Apparatus, as recited in claim 5, wherein said static longitudinal side supports comprise a pair of parallel tracks between which is disposed said curing area, said transverse beams including vertical supports at each end thereof, said vertical supports including wheel means at the bottom thereof riding in said parallel tracks.

7. Apparatus, as recited in claim 6, including winch means at each end of said longitudinal side supports for moving said transverse beams along the length thereof.

8. Apparatus, as recited in claim 6, wherein said transverse beams include tracks along the length thereof, said platform being mounted on wheels riding in said tracks.

9. Apparatus, as recited in claim 1, wherein said platform means includes elevation means adapted to raise and lower said forming means.

10. Apparatus, as recited in claim 9, wherein said elevation means comprises scissor jack supports between said platform means and said transverse beams.

11. Apparatus, as recited in claim 10, wherein said mounting means comprises static longitudinal side supports, transverse beams suspended therebetween, a forming means platform mounted on said transverse beams, means for moving said platform along said transverse beams and means for moving said transverse beams along the length of said longitudinal side supports, further wherein said static longitudinal side supports comprise a pair of parallel tracks between which is disposed said curing area, said transverse beams including vertical supports at each end thereof, said vertical supports including wheel means at the bottom thereof riding in said parallel tracks, and further wherein said transverse beams include tracks along the length thereof, said platform being mounted on wheels riding in said tracks.

* * * * *